United States Patent [19]

Niskanen

[11] Patent Number: 4,757,585

[45] Date of Patent: Jul. 19, 1988

[54] VARIABLE-CROWN ROLL

[75] Inventor: Juhani Niskanen, Muurame, Finland

[73] Assignee: Valmet Oy, Finland

[21] Appl. No.: 34,167

[22] Filed: Apr. 1, 1987

[30] Foreign Application Priority Data

Nov. 10, 1986 [FI] Finland .................................. 864564

[51] Int. Cl.$^4$ ............................................. B21B 13/02
[52] U.S. Cl. .................................................... 29/116.2
[58] Field of Search ......... 29/116 R, 116 AD, 113 R;
100/162 B, 93 RP

[56] References Cited

U.S. PATENT DOCUMENTS

| 4,299,162 | 11/1981 | Hartmann et al. | 29/116 AD |
| 4,327,468 | 5/1982 | Küstus et al. | 29/116 AD |
| 4,399,747 | 8/1983 | Schiel et al. | 29/116 AD |
| 4,429,446 | 2/1984 | Lehmann | 29/116 AD |
| 4,440,077 | 4/1984 | Schiel | 29/116 AD |

Primary Examiner—Timothy V. Eley
Assistant Examiner—Irene Cuda

[57] ABSTRACT

A variable-crown roll for forming a nip with a counter-roll includes a rotatably mounted roll mantle and a fixed central axle situated within the roll mantle defining a space therebetween in which nip profile adjustment devices, such as hydrodynamic glide-shoes mounted on pistons, are provided. The roll mantle is journaled on the central axle which in turn is supported at its ends at points axially outside of the journaling points of the roll mantle. An annular member is provided between each of the end portions of the central axle within the mantle or an extension thereof. A bearing or bearings for journaling the roll mantle on the fixed central shaft is mounted at each end of the roll between a respective annular part and an end region of the mantle or an extension thereof. Hydraulic power devices are provided at each end of the roll between the annular part and the end portion of the central axle which act in the plane of the nip. The hydraulic power devices are loaded by pressurized fluid so that the nip formed by the variable-crown roll and its counter-roll can be opened or closed. Moreover, the hydraulic power devices apply forces to the ends of the roll mantle for equalizing the distribution of loading forces.

20 Claims, 6 Drawing Sheets

VARIABLE-CROWN ROLL

BACKGROUND OF THE INVENTION

The present invention relates generally to variable-crown rolls, and more particularly, to variable-crown rolls including a fixed, central axle and a roll mantle rotatably mounted on the axle defining a space therebetween in which apparatus for adjusting the nip profile formed by the roll with a counter-roll can be adjusted. Such nip profile adjustment apparatus can include hydrodynamic glide-shoes mounted on pressure fluid controlled loading-pistons or one or more pressure-fluid chambers occupying the space between the central axle and the inner surface of the roll mantle. The glide-shoe piston devices or the like are arranged to act substantially in the plane of the nip or symmetrically with respect to the nip. The roll mantle is typically rotatably journaled at regions proximate to both of its ends by means of bearings while the fixed central axle is typically supported at points axially outside of the points at which the roll mantle is journaled on the central fixed shaft.

Variable-crown rolls of the type described above are commonly used in paper machines to form dewatering press nips, smoothing nips, calendering nips and the like with counter-rolls. For such purposes, it is important that the distribution of the linear load, i.e., the profile of the nip in the axial direction of the rolls, is either constant or adjustable as desired, such, for example, so as to control the transverse moisture profile and/or thickness profile or caliper of the web. There are many examples in the prior art of variable or adjustable-crown rolls which are designed in an attempt to provide adjustability for the distribution of the linear load in a nip formed by such rolls and corresponding counter-rolls.

Conventional variable-crown rolls used in paper machines generally comprise either a solid or tubular, fixed central roll axle or shaft and a roll mantle rotatably mounted around the fixed axle. Hydraulic pressure-actuated glide-shoe arrangements and/or one or a series of pressure-fluid chambers are arranged within the space between the fixed axle and the roll mantle for aligning or adjusting the axial profile of the mantle at the nip. Generally, the nips formed by such variable-crown rolls, such as press nips or calendering nips, are loaded by means of forces applied to the axle journals of the variable-crown roll and the associated counter-roll.

The counter-roll forming the nip with the variable-crown roll generally is mounted on rotating axle journals which are permanently fixed to the mantle of the counter-roll. On the other hand, a variable-crown roll is journaled on the fixed, central axle, which is generally quite massive. The distance between the opposite journal bearings of the counter-roll usually differs from the corresponding distance between the journal bearings of the variable-crown roll, the latter usually being substantially smaller than the former, thereby resulting in certain drawbacks.

For example, the difference between the bearing distances of the variable-crown roll and its counter-roll can result in the shapes of the crowns of the variable-crown roll and its counter-roll differing from each other. Various attempts have been made to resolve this problem. For example the rolls can be crowned. However, this technique will result in a uniform nip profile at only one particular linear load. Heating devices have been used in calender rolls to heat the roll mantle at portions at which higher linear loads are desired. However, such techniques also have their own limitations and drawbacks. Attempts have also been made to obtain a uniform nip profile by designing the variable-crown roll to have an extended bearing distance. However, this technique only results in creating new problems in connection with the frame construction of the paper machine. It has also been suggested to use an articulated bearing and a rolling bearing, situated one over the other, in the journaling of a variable-crown roll and its counter-roll to obtain a uniform nip profile. However, this technique requires a significant amount of space. Still other techniques for obtaining a uniform nip profile have been suggested, such as so-called self-acting counter-moment rolls.

It has also been suggested to provide a variable-crown roll with an extended mantle so that the bearing distances of the variable crown roll and counter-roll are substantially equal. In such arrangements, the crown line of the variable-crown roll will substantially correspond to the crown line of the counter-roll whereby the caliper profile of the nip formed by the variable-crown roll and the counter-roll is substantially uniform. Extending the mantle of the variable-crown roll, however, results in numerous drawbacks.

For example, it is difficult to service the end regions of the roll mantle. The major part of the range of adjustment of the hydraulic loading elements, e.g., the hydrodynamic glide-shoe loading-piston devices, must often be used for correcting the deviation of the crown at the end regions of the roll. For this reason, the effective adjustment range available for correcting deviations in the mid-region of the roll is not as large as would be desirable.

Nip-forming roll couples which include a variable-crown roll are also known which do not require separate loading arms for applying nip-loading forces. In such arrangements, the length of the stroke of the glide-shoe loading-pistons is designed to be relatively large so as to be sufficient to produce the nip opening and closing movements of the roll mantle thereby eliminating the requirements for separate loading arms which normally act upon the ends of the roll axle. In such variable-crown rolls, the hydraulic loading elements which act upon the inner surface of the roll mantle also produce the nip pressure loading as well as crown variation and adjustability of the nip profile. However, these constructions also present certain drawbacks. For example, such variable-crown rolls are relatively complicated in construction, and, moreover, it is difficult to provide a stroke length for the loading pistons between the stationary central axle and the roll mantle which is sufficient to enable the nip to be opened and closed while at the same time obtaining adequate loading and a sufficient degree of adjustability for the nip profile. The end regions of the roll mantle have presented the greatest problems in this respect.

Regarding prior art relevant to the invention, reference is made to Finnish Patent No. 57,004, corresponding to U.S. Pat. No. 3,885,283, to Finnish Patent No. 67,923, corresponding to German Offenlegungsschrift No. 3,003,396, and to cancelled Finnish patent application No. 791,581, corresponding to published GB patent application No. 2,022,775.

A variable-crown roll is disclosed in Finnish Patent No. 57,004 in which the length of the stroke of the glide-shoe loading-pistons is designed to be relatively large so as to be sufficient for obtaining desired compression loading as well as the raising movement of the variable-crown roll mantle. The ends of the roll mantle are provided with guides for guiding the mantle in the direction of the nip plane so that no other devices are required for either compression loading or for opening and closing the nip.

A variable-crown roll construction is disclosed in Finnish Patent No. 67,923 in which power units are provided between the central axle and the ends of the roll mantle axially outwardly of the roll mantle bearings by means of which the roll mantle is subjected to forces for adjusting the loading profile of the mantle.

A variable-crown roll is disclosed in cancelled Finnish Application No. 791,581 which is, perhaps, most closely related to the present invention. In particular, a variable-crown roll is disclosed wherein pistons are arranged in cylinders formed in the fixed, central axle at positions which face the inner races of the roll mantle bearings. The pistons act exclusively for raising the roll mantle in order the open the nip and it is not possible for such pistons to produce forces which would load the nip.

SUMMARY OF THE INVENTION

Accordingly, it is an object of the present invention to provide new and improved variable-crown rolls which avoid the draw-backs of conventional variable-crown rolls.

Another object of the present invention is to provide new and improved variable-crown rolls which do not require separate loading arms, i.e., in which the movement of the roll away from the counter-roll to open the nip, generally on the order of between about 30 to 100 mm, as well as the movement of the roll towards the counter-roll to close the nip, and at the same time wherein the end regions of the roll are loaded by means of hydraulic glide-shoe loading-piston devices situated within the mantle of the variable-crown roll or extensions thereof.

Still another object of the present invention is to provide new and improved variable-crown rolls wherein power units are arranged within the roll mantle or extensions provided at its ends, between the central axle and the roll mantle, axially inwardly or outwardly of the roll mantle bearings, by which the nip can be both opened and closed and, moreover, by which loading forces can be directed at the ends of the roll mantle in an optimum manner such that the full range of adjustment of the hydraulic glide-shoe loading-piston devices remains available for compensating for localized variations in the nip profile.

A further object of the present invention is to provide new and improved variable-crown rolls having the capability of producing compensation moments of adjustable magnitude acting on end regions of the roll mantle so that the roll mantles of the variable-crown roll and counter-roll have substantially identically shaped bending lines at the nip formed thereby.

Briefly, in accordance with the present invention, these and other objects are attained by providing a variable-crown roll wherein an annular member is provided on each end portion of the fixed, central axle within the rotating roll mantle and/or within an extension of the mantle, and around which the bearing or bearings by which the roll mantle is journaled on the fixed, central axle are situated.

Hydraulic power means are provided between each annular member and the respective end portion of the fixed, central axle. The hydraulic power means are loaded by means of hydraulic fluid under pressure for partial generation of the forces which load the nip and, moreover, the power means can operate to displace the roll mantle of the variable-crown roll relative to the central axle so as to open or close the nip.

Furthermore, in accordance with certain embodiments of the invention, means are provided within the mantle of the variable-crown roll between the roll mantle bearings for producing compensation moments which act on both of the end regions of the roll mantle. The magnitudes of the compensation moments are adjustable through adjustment of moment-creating compensation forces so as to produce substantially equal bending for the mantles at the nip formed between the counter-roll and the variable-crown roll.

In accordance with one embodiment of the invention, an annular member is provided within the mantle and/or an extension thereof on each of the end portions of the fixed, central axle. The roll mantle bearing or bearings at each end are provided between the annular member and the end region of the mantle or an extension thereof and hydraulic power means are arranged between each annular member and the respective end portion of the fixed, central axle of the variable crown roll, the hydraulic power means acting substantially in the plane of the nip. In accordance with this embodiment, the hydraulic power means are adapted to be loaded by means of hydraulic pressure fluid so that the nip formed by the variable-crown roll and its counter-roll can be opened or closed and, moreover, so that the hydraulic power means apply loading forces to the ends of the roll mantle that equalize the distribution of the loading forces over the length of the nip.

In accordance with the illustrated embodiments, hydraulic glide-shoe loading-piston and cylinder arrangements are provided within the end regions of the rotating mantle, and/or within extension sleeves provided at the ends of the mantle, preferably in the vertical plane of the bearings and at both sides of the central axle. These devices produce at least the part of the nip loading within the area of the ends of the roll mantle. Moreover, the hydraulic devices are operable to effect movement of the roll mantle to open and close the nip.

According to an embodiment of the invention wherein an extension of the mantle of the variable-crown roll is not utilized, a "missing" moment is produced at the ends of the mantle which can be adjusted to a suitable magnitude through the use of a sleeve situated within the roll mantle, or other corresponding component, which is pressed, for example, by means of a load-shoe arrangement, by means of which compensating moments are produced without interfering with the nip loading. According to the invention, the moment which equalizes the nip profile can be produced by means of hydrostatic or equivalent glide-shoe loading-piston elements similar to those used in conventional variable-crown rolls for crown adjustment.

DESCRIPTION OF THE DRAWINGS

A more complete appreciation of the present invention and many of the attendant advantages thereof will be readily appreciated as the same becomes better understood by reference to the following detailed description taken in conjunction with the drawings in which.

DETAILED DESCRIPTION OF THE PREFERRED EMBODIMENTS

Figure 1:
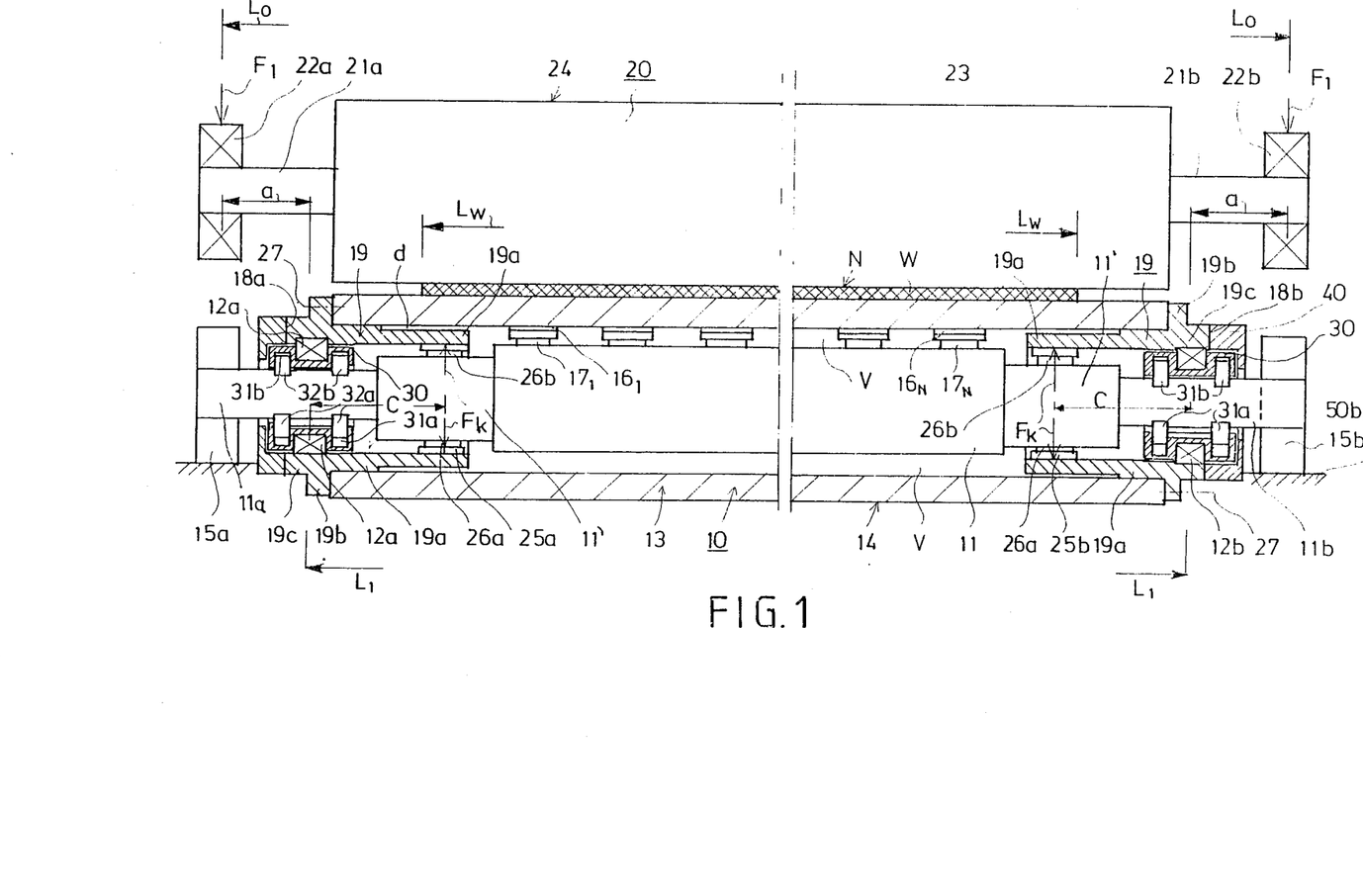
FIG. 1 is a schmatic axial section view of a variable-crown roll in accordance with the invention, shown forming a nip with a counter-roll.
Figure 2:
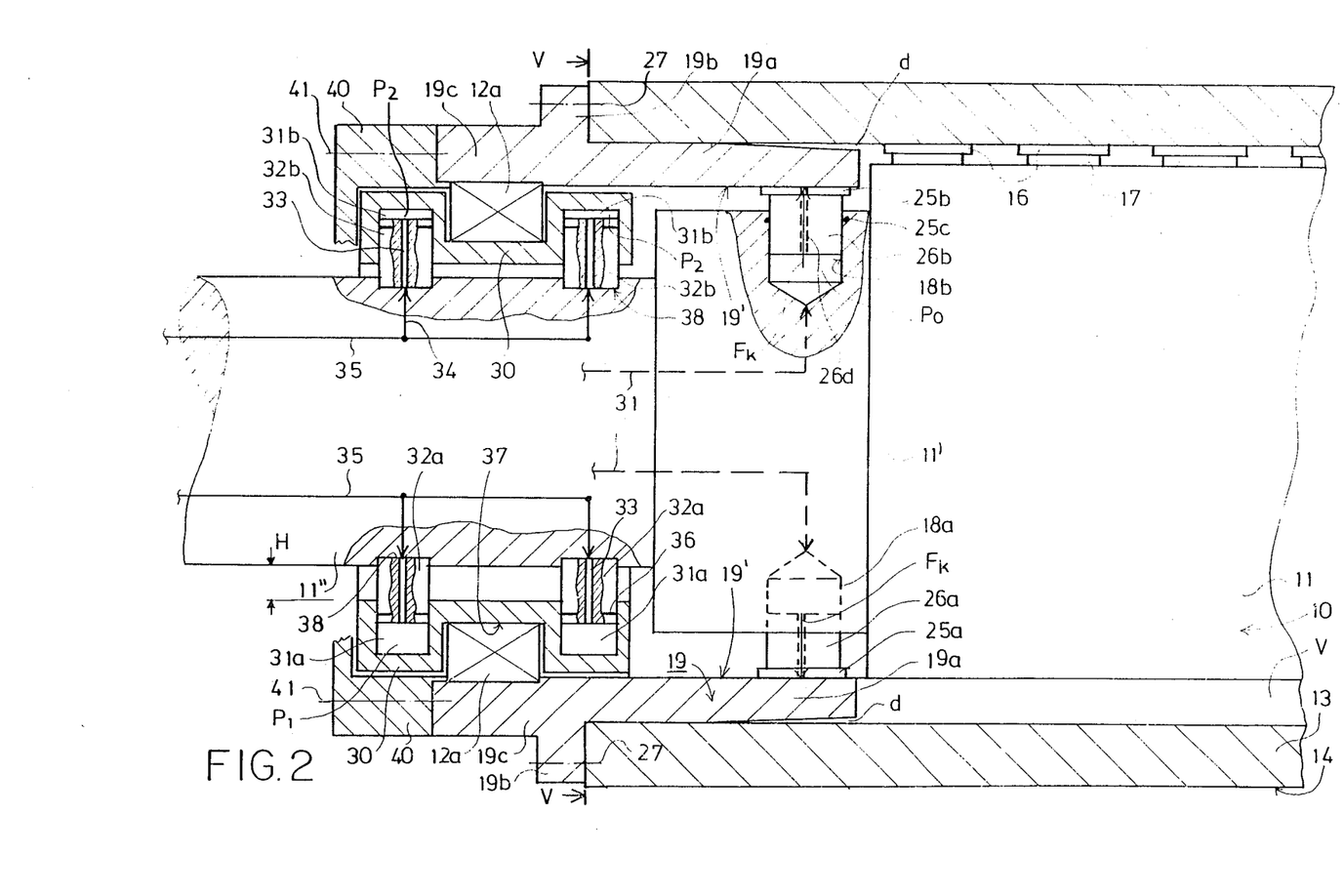
FIG. 2 is a partial axial section view of an end region of a variable-crown roll in accordance with the invention.

Referring now to the drawings wherein like reference characters designate identical or corresponding parts throughout the several views, and more particularly to FIGS. 1 and 2, a variable-crown roll 10 in accordance with the invention is shown forming a nip N with a counter-roll 20 through which a web W having a width $L_W$ passes, possibly together with one or more felts. The mantles 13 and 23 of the variable-crown roll 10 and counter roll 20 may be grooved, in which case a felt will pass through nip N, or may have smooth surfaces 14 and 24, as illustrated. The counter-roll 20 is rotatably mounted at its axle journals 21a and 21b by means of bearings 22a and 22b, which are spaced from each other by a bearing distance $L_0$.

The variable-crown roll 10 includes a fixed central shaft or axle 11 having opposite axle end portions 11' and a main axle portion extending between them, and the roll mantle 13. The mantle 13 of the variable-crown roll 10 is supported on the stationary central axle 11 which itself is mounted at the outer ends 11a and 11b of end portions 11' by articulated bearings 15a and 15b supported on stationary frame members 50a and 50b. It is noted that the variable-crown roll 10 has no loading arms. The mantle 13 of variable-crown roll 10 is rotatably mounted on the end portions of the central axle 11 by bearing means including bearings 12a, 12b which are spaced from each other by a bearing distance $L_1$ which is smaller than the bearing distance $L_0$ of counter-roll 20. In particular, referring the FIG. 1, each roll mantle bearing 12a, 12b is spaced axially inwardly a distance a from the corresponding counter-roll bearing 22a, 22b, so that $L_0 - L_1 = 2 \times a$.

A space is defined between the main portion of axle 11 (between axle end portions 11') and the inner surface of roll mantle 13. A series of hydrodynamic glide-shoes $16_1-16_N$ are situated in the space which are connected to and loaded by pistons $17_1-17_N$ situated in cylinder bores 11p (FIG. 3) formed in axle 11. The glide-shoe loading-piston devices 16, 17 are situated to act in the plane of the nip N and cylinder bores 11p are adapted to communicate with a source of hydraulic fluid. The pressure of the hydraulic fluid supplied to cylinder bores 11p can be adjusted so that the nip N can be loaded and its profile adjusted and controlled by supplying hydraulic fluid to the cylinder bores 11p at appropriate pressures.

The variable-crown roll 10 further includes a pair of end members 19, each of which is connected to the roll mantle 13 at a respective end region thereof. Each end member 19 includes a sleeve portion 19a situated within the roll mantle, a radially extending flange portion 19b integral with the sleeve 19a and an annular portion 19c integral with the sleeve and flange portions. The annular portions 19c of end members 19 extend axially outwardly from the roll mantle beyond its ends and constitute extensions of the roll mantle. The flange portions 19b overlie outer radial surfaces of the ends of the roll mantle 13 and are fastened to the roll mantle by conventional means, such as by screws 27, to thereby fasten the end members 19 to the roll mantle.

The annular portions or roll mantle extensions 19c function in the illustrated embodiment as the rotating outer races of the roll mantle bearings 12a, 12b. End caps 40 are attached to the outer radial surfaces of the roll mantle extensions 19c by means of screws 41.

An annular member 30 is provided between each of the central axle end portions 11' and a respective one of the bearings 12a and 12b, and function as the stationary inner races of the roll mantle bearings 12a and 12b. Each annular member 30 is formed with an outwardly facing circumferential groove 37 in which the rolling members of a respective bearing 12a, 12b are situated.

Figure 5:
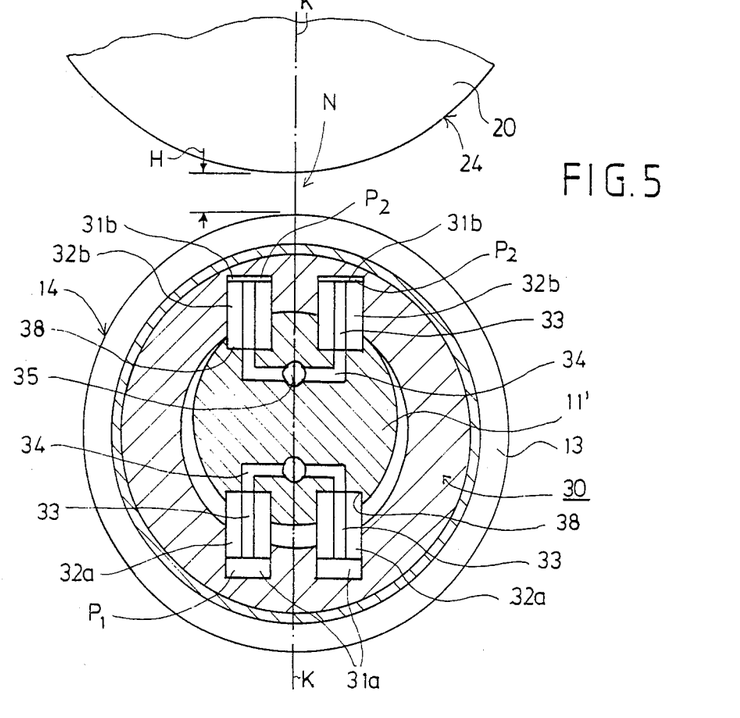
FIG. 5 is a transverse section view of another embodiment of a variable-crown roll in accordance with the invention at a location corresponding to a section taken along line IV—IV of FIG. 2.

In the embodiment of FIG. 2, a first cylinder-piston set comprising a pair of cylinder-piston arrangements are provided axially inwardly of each roll bearing 12a, 12b which act in opposite directions substantially within the plane containing the nip N and the axis of roll 10. Similarly, a second cylinder-piston set comprising a pair of oppositely acting cylinder-piston arrangements are provided outwardly of each bearing 12a, 12b and also act substantially within the plane of the nip and roll axis. In the embodiment of FIG. 5, the first and second cylinder-piston sets each comprise two pairs of cylinder-piston arrangements situated symmetrically on respective lateral sides of the plane containing the nip and roll axis.

In particular, referring to the embodiment of FIG. 2, the first cylinder-piston set comprises a pair of cylinder bores 31a, 31b formed in annular part 30 in which pistons 32a and 32b are provided with seal rings 36. The second cylinder-piston set comprises cylinder bores 31a, 31b in which pistons 32a and 32b are provided. The pistons 32a, 32b are situated substantially in the central radial plane of axle 11. The inner ends of pistons 32a, 32b engage and are preferably fixed to lands or the like formed in the end portions 11' of central axle 11. The pistons 32a, 32b are provided with ducts 33 which communicate with radial oil passages 34 formed in axle 11 which in turn communicate with axial oil ducts 35 formed in the end portions 11' of axle 11, or which may extend outside of the axle end portions. The oil ducts 34, 35 are adapted to be connected to a source of pressurized oil so that the lower piston chambers defined by cylinder bores 31a and the outer surfaces of pistons 32a can be pressurized at a first pressure $P_1$ while the upper piston chambers defined by upper pistons 32b and cylinder bores 31b can be pressurized at a different pressure $P_2$.

As shown in FIG. 2, the roll mantle 13 is practically in its lowermost position at which the nip N is open. The roll mantle 13 ca be raised over a distance H by increasing the pressure $P_2$ acting on the upper pistons 32b and decreasing the pressure $P_1$ acting on the lower pistons 32a. The roll mantle 13 can in this manner be raised to an upper position where the nip N is closed. Additionally, by suitably selecting the pressures $P_1$, $P_2$ and through suitable operation of the loading elements 16, 17, the nip N can be loaded in an optimum manner, including the lateral or end areas of the nip.

The cylinder-piston sets and associated structures thus comprise hydraulic power means which at least partially generate the forces loading the nip and which are also capable of displacing the roll mantle relative to its central axle to open and close the nip.

Still referring to the embodiment of FIGS. 1 and 2, the sleeve portions 19a of the end members 19 extend into the mantle 13 of roll 10. At least a part of the sleeve portion 19a of each end member 19 has an outer surface which is at least slightly spaced a distance d from the inner surface of the roll mantle to allow a slight play therebetween. Opposed cylinder bores 18a and 18b are formed in an inner section of each end portion 11' of axle 11, the inner section having a reduced diameter relative to the main axle portion. Pistons 26a, 26b, provided with seals 25c, are fitted within cylinder bores 18a and 18b, which carry lubricated glide-shoes 25a, 25b on their outer ends such, for example, by means of articulated joints. The glide-shoes 25a, 25b slidably engage the inner or glide surface 19' of sleeve portion 19a. It is understood that a similar pair of oppositely acting pistons 26a, 26b are provided at the opposite end portion of central axle 11 so that there are preferably two pairs of pistons 26a, 26b. Again, these pistons preferably act substantially within the plane containing the nip N and central axis of roll 10. Hydraulic fluid at a suitable adjustable pressure $P_0$ is passed into piston chambers defined by the pistons 26a, 26b, and cylinder bores 18a and 18b through ducts 31 from where the pressurized fluid. which also acts as a lubricant, is passed into the lubrication spaces (not shown) of the glide-shoes 25a, 25b through bores 26d in pistons 26a, 26b. When the pistons and glide shoes are pressurized in this manner, compensation forces $F_k$ are produced which have a torque arm C (FIG. 1) with respect to the roll mantle bearings 12a and 12b. Thus, by pressurizing the cylinders 18a and 18b at both of the end portions of the roll, a moment $M_2$ tending to bend the roll downwardly is produced at the nip N or a corresponding upwardly bending moment is produced if the counter-roll 20 is bent towards the nip N under its own weight. The moment $M_2$ is defined in accordance with the following equation:

$$M_2 = C \times F_k \quad (1)$$

By adjusting the pressure $P_0$ the moment $M_2$ can be adjusted so that the shape of the crown of the roll mantle 13 of the variable-crown roll 10 at nip N will be substantially the same as the shape of the crown of the counter-roll 20. By suitable adjustment of pressures, the profile of the caliper of the nip can be made uniform and constant.

The end members 19 and glide-shoe loading-piston arrangements and associated structures thus comprise means for producing compensation moments of adjustable magnitude which act on end regions of the roll mantle. The magnitudes of the compensation moments are adjustable to a level whereby the roll mantles of the variable crown roll and counter-roll have substantially identically-shaped bending lines at the nip formed thereby.

It should be clear that although two oppositely acting glide shoe devices 25a, 25b are provided in the sleeve portion 19a of each of the end members 19 as shown in FIG. 1, the compensation forces $F_k$ acting upwardly and downwardly above and beneath axle 10 are not effective at the same time since if they were, these forces and the moments produced thereby would effectively cancel each other. Referring to FIG. 1, when it is desired to bend the end regions of the roll mantle 13 downwardly at the nip N, the upper compensation forces $F_k$ are controlled to act upon the upper glide shoe 25b. On the othe hand, when it is desired to bend the end regions of mantle 13 upwardly, the glide-shoe 25a situated beneath the axle 11 is subjected to the compensation force $F_k$.

The operation of the embodiment of FIGS. 1 and 2 will now be described. Compensation forces $F_k$ produce compensation moments $M_2$ through sleeve portions 19a of end members 19. The compensation forces $F_k$ produce appropriate moments which are fully effective even from the points at which the sleeve portions 19a last contact the inner surface of the roll mantle 13. This is to be contrasted with conventional variable-crown rolls wherein the moment acting at the ends of the roll are substantially insignificant and only increase in a linear manner from about 0 at the ends of the roll to the desired constant moment magnitude.

Figure 6:
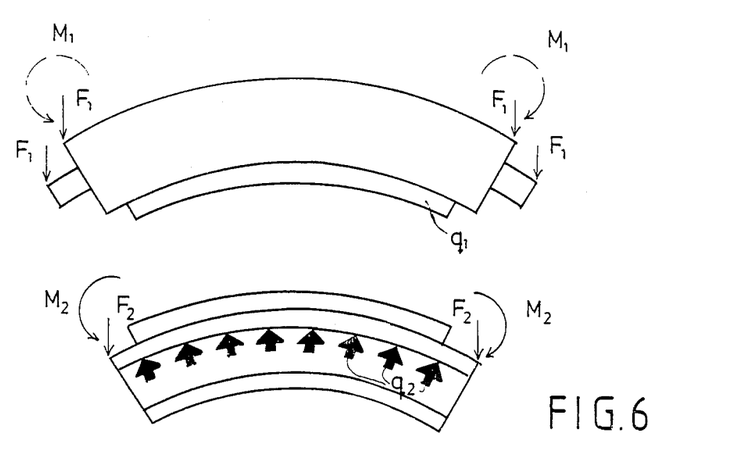
FIG. 6 is a schmatic view illustrating the principle of the bending and loading of a variable-crown roll and an associated counter-roll and illustrating the forces and moments produced and required.

General conditions and considerations by which the compensation moments $M_2$ influence the ability to obtain uniform nip pressures will be discussed with reference to FIGS. 6 and 7. FIG. 6 is a schmatic illustration of a variable crown-roll 10 and counter-roll 20 forming a nip showing the possible shapes of the rolls in greatly exaggerted form. The end moments acting on counter-roll 20 and variable-crown roll 10 are designated $M_1$ and $M_2$ respectively. When the counter-roll 20 is loaded by means of forces $F_1$ at its axle journals, moments $M_1$ are produced at its ends and a load distribution $q_1$ is produced on the mantle of the counter roll 20 at web W. Correspondingly, forces $F_2$ act upon the ends of the roll mantle 13 of the variable-crown roll 10 which produce moments $M_2$ in accordance with the above equation (1). An inner load $q_2$ is produced on the mantle 13 by means of the hydraulic loading elements 16, 17 and 31, 32 acting on the inner surface of the roll mantle 13. In the case shown in FIG. 6, an optimal, uniform loading situation can be designated by the following equation:

$$\frac{F_1}{F_2} = \frac{M_1}{M_2} = \frac{q_1}{q_2 - q_1}$$

In loading a variable-crown roll 10 in accordance with the invention, consideration should also be given to the weight of the ends of the roll which improves the uniformity of the linear load distribution of the nip N.

Figure 7:
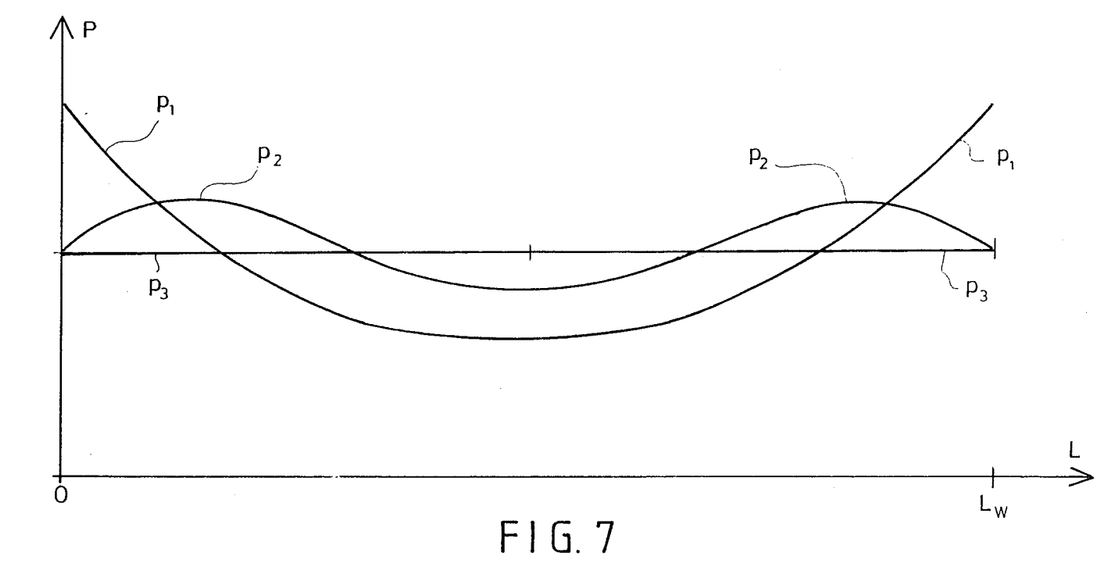
FIG. 7 is a graphical illustration showing various distributions of the nip profile.

FIG. 7 is a graphical illustration of three examples of the distribution or profile of the linear load P in a roll nip in the direction of the width of the machine. The width of the web is designated $L_W$. The profile $p_1$ is illustrative of a linear load distribution obtained in a nip formed by a roll that is freely mounted at its ends and with no zone correction, such as would be provided by the hydraulic loading elements 16, 17, and counter-roll. The profile $p_2$ is representative of a linear load distribution when the ends of the roll are acted upon by optimal correction forces. The linear load distribution represented by $p_3$ is the ideal case where the ends of the roll are provided with both correcting forces as well as compensation moments $M_2$ as described above in equations (1) and (2). The embodiment of the invention shown in FIGS. 1 and 2 can be operated to closely approach the ideal load distribution $p_3$. It is not possible to completely correct the distribution of the load profile $p_1$ by means of zone adjustment, and, in any case, if the distribution profile were corrected by means of such conventional zone adjustment, a significant part of the adjustment capacity is lost as discussed above. When optimal correction forces are applied to the ends of the roll to obtain a load profile as shown by $p_2$, the additional use of zone adjustment can obtain an almost ideal correction. However, some of the adjustment capacity of the zone adjustment devices will be lost as in the above case. However, when the ideal situation represented by profile $p_3$ is approached in the operation of the first embodiment of the invention shown in FIGS. 1 and 2, it is not necessary to utilize zone adjustment in order to correct basic non-uniformities in the linear load distribution (as would be the case in the correction of the profiles $p_2$), but the entire range of the zone adjustment remains available for the correction of any other flaws in the transverse profile of web W.

Figure 3:
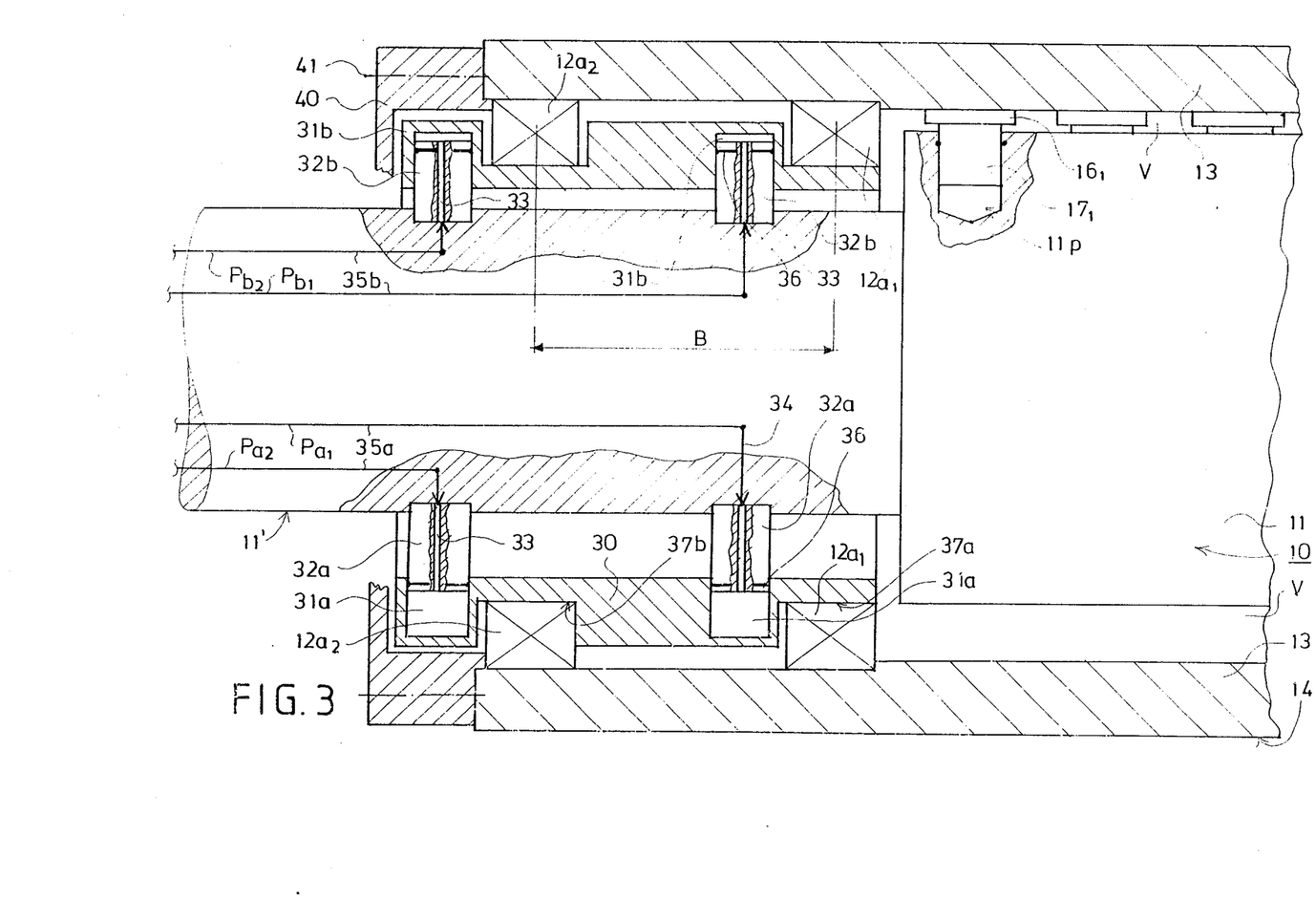
FIG. 3 is a partial axial section view of the end region of a second embodiment of a variable-crown roll in accordance with the invention.

Referring to FIG. 3, a second embodiment of the invention is illustrated wherein the bearing means by which the roll mantle 13 is rotatably mounted on the central axle 11 includes, at each end of the roll, an inner bearing $12a_1$ and an outer bearing $12a_2$ situated in corresponding axially spaced grooves of the annular member 30. Both bearings are situated within the mantle 13 at each end region thereof. The bearing distance between bearings $12a_1$ and $12a_2$, designated B in FIG. 3, is considerable. Thus, the inner race of each of the bearings $12a_1$ and $12a_2$ comprises annular part 30 in grooves 37a and 37b of which the bearing rolling members are situated.

Still referring to the embodiment of FIG. 3, cylinder-piston arrangements 31a, 32a; 31b, 32b, are arranged at both sides of the outer bearing $12a_2$ with the inner cylinder-piston arrangement being situated within the bearing distance B, proximate to the inner bearing $12a_1$. Hydraulic fluid is passed into the piston cylinders through ducts 33 formed through pistons 32a and 32b, and pipes 35a and 35b, so that each piston chamber can be pressurized as desired independently of the pressures in the other piston chambers. In this manner, it is possible to both open and close the nip N by displacing the roll mantle 13 relative to the central axle 11, and additionally, to produce optimal loading forces at the end regions of the nip N. By adjusting the magnitudes and/or ratios of pressures $P_{b1}$ and $P_{b2}$, it is possible to set the magnitudes of the end loading forces and/or the level of their resultant in the axial direction in an advantageous manner, even to the extent that some of the compensation moment affect defined by equation (1) is obtained for the roll mantle. In other respects, the construction of the embodiment of FIG. 3 is similar to that described above in connection with FIGS. 1 and 2.

Figure 4:
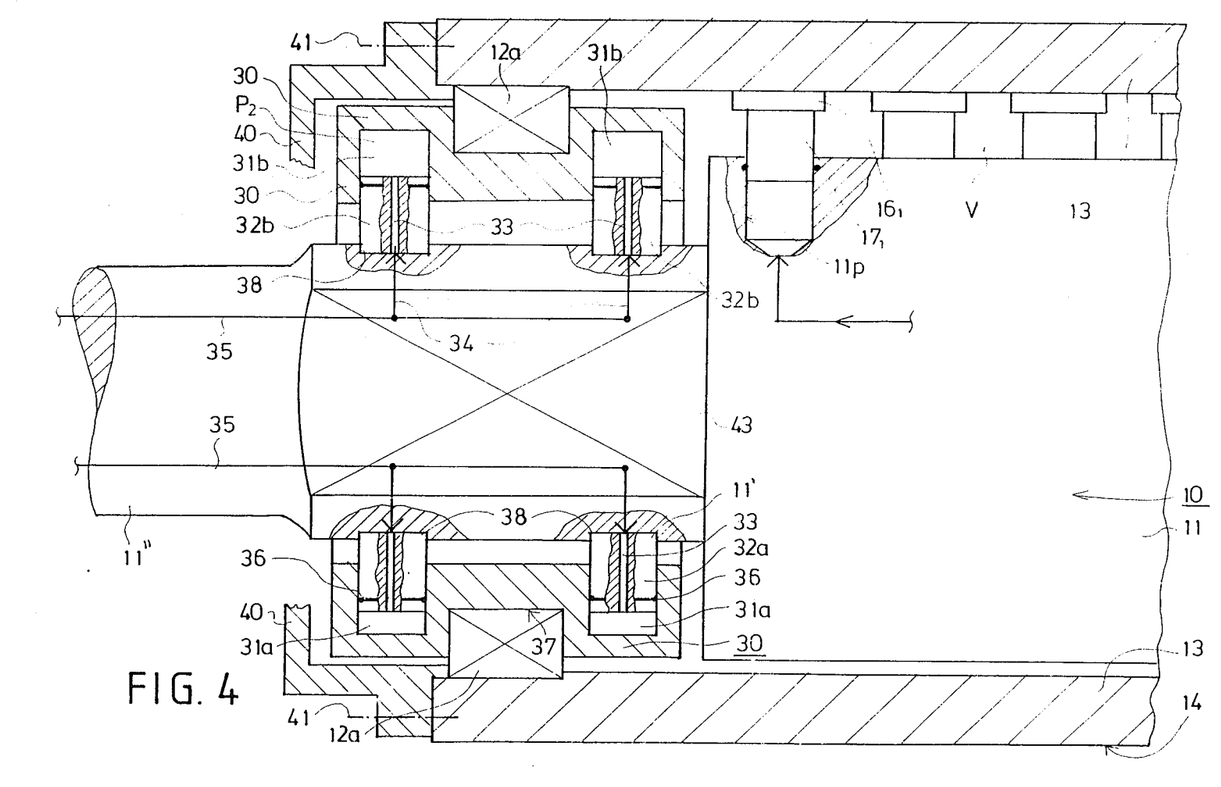
FIG. 4 is a partial axial section view of an end region of a variation of the second embodiment of the variable-crown roll shown in FIG. 3.

FIG. 4 shows a variation of the embodiment of FIG. 3 wherein the hydraulic power means that produce the compensation moment $M_2$ in the embodiment of FIGS. 1 and 2 are not used. In accordance with the embodiment of FIG. 4, the bearings 12a of the roll mantle 13 are fitted in the groove 37 of the annular member 30, and hydraulic piston-cylinder arrangements 31a, 32a; 31b, 32b, are provided at both sides of the bearing 12. The end portion of axle 11' is provided with plane opposed side surfaces 43. In other respects, the construction is similar to the construction described above in connection with FIG. 3.

Referring to FIG. 5, another embodiment of the invention is illustrated wherein the hydraulic power means comprise first and second cylinder-piston sets provided inwardly and outwardly of each bearing 12a, 12b, and where, unlike the embodiment of FIGS. 1 and 2, each cylinder-piston set comprises two pairs of cylinder-piston arrangements situated symmetrically on respective lateral sides of the plane containing the nip and roll axis. Thus, cylinders 31a, 31b and pistons 32a, 32b provided therein are situated symmetrically on both sides of the central plane K—K. In this manner, it is possible to produce efficient power effects by means of lower pressures $P_2$ and $P_1$ and/or by means of smaller sectional areas of cylinders 31 and pistons 32. The nip N between the variable-crown roll 10 and the counter-roll 20 is shown in FIG. 5 in its open position wherein the gap between the rolls 10 and 20 is denoted by H.

Obviously, numerous modifications and variations of the present invention are possible in the light of the above teachings. It is therefore to be understood that within the scope of the claims appended hereto, the invention may be practiced otherwise than as specifically disclosed herein.

I claim:

1. A variable-crown roll for forming a nip with a counter-roll, comprising:

a rotatably mounted hollow roll mantle having opposite ends and an inner surface;

a fixed central axle situated within said roll mantle and having a main axle portion and a pair of opposite end portions, said inner surface of said roll mantle and an outer surface of at least said main axle portion defining a space between them:

means situated within said space defined between said roll mantle inner surface and said outer surface of said main axle portion for adjusting the profile of the nip formed between the variable-crown roll and said counter-roll;

bearing means for rotatably mounting said roll mantle on said fixed central axle at regions proximate to said mantle ends, said bearing means including at least one roll mantle bearing provided between each of said opposite end portions of said central axle and said roll mantle or an extension thereof;

means for supporting said fixed central axle at outer regions of said end portions thereof which are situated axially outside of said roll mantle bearing means;

an annular member provided between each of said central axle end portions and a respective one of said at least one roll mantle bearing;

hydraulic power means adapted to be coupled to a source of pressurized hydraulic fluid and situated between each of said annular members and a respective one of said central axle end portions for at least partially generating the forces loading the nip and for displacing said roll mantle relative to its central axis to open and close the nips; and means situated within said roll mantle and between said roll mantle bearing means for producing compensation moments of adjustable magnitude acting on end regions of said roll mantle, the magnitude of said compensation moments being adjustable to a level that the roll mantles of the variable-crown roll and counter-roll have substantially identically shaped bending lines at the nip formed thereby.

2. The combination of claim 1 wherein,
said variable-crown roll further includes a pair of end members, each connected to said roll mantle at respective end regions thereof, and each including a sleeve portion situated within said roll mantle and having an inner glide surface extending around a respective end portion of said axle, and wherein
said means for producing compensation moments include at least one cylinder formed in each end portion of said central axle adapted to be coupled to a source of pressurized hydraulic fluid, a piston situated in each respective cylinder, and a glide-shoe mounted on each piston adapted to act on said inner glide surface of said sleeve portion of said end member for producing said compensation moments.

3. The combination of claim 2 wherein a least a part of said sleeve portion of each said end member has an outer surface which is at least slightly spaced from said inner surface of said roll mantle to allow play therebetween.

4. The combination of claim 2 wherein each of said end members includes a radially extending flange portion integral with said sleeve portion, said flange portions overlying outer radial surfaces of said ends of said roll mantle, and means for attaching said flange portions to said roll mantle to thereby attach said sleeve portions to said roll mantle.

5. The combination of claim 2 wherein,
each of said end members includes an annular portion integral with said sleeve portion, said annular portions extending axially outwardly from said roll mantle beyond said ends thereof and constituting extensions of said roll mantle, and
each said at least one roll mantle bearing of said bearing means being provided between a respective one of said opposite end portions of said central axle and said annular portion of a respective one of said end members constituting an extention of said roll mantle.

6. The combination of claim 1 wherein said hydraulic power means are structured to act upon said end portions of said central axle substantially in the plane of the nip.

7. The combination of claim 1 wherein said hydraulic power means are structured to act upon said end portions of said central axle substantially symmetrically with respect to the plane of the nip.

8. The combination of claim 1 wherein said hydraulic power means include cylinder-piston pairs comprising substantially radially extending cylinder bores formed in each of said annular members, and a piston mounted for movement in each of said cylinder bores, each of said pistons having an outer end defining a pressure chamber with a corresponding cylinder and an inner end engaging a respective one of said central axle end portions, said pressure chambers adapted to be coupled to a source of pressurized hydraulic fluid.

9. The combination of claim 8, wherein said inner end of each of said pistons is attached to a respective one of said central axle end portions.

10. The combination of claim 8 wherein said bearing means comprise a pair of roll mantle bearings including an axially outer bearing and an axially inner bearing provided between each respective one of said opposite end portions of said central axle and said roll mantle or an extension thereof, and wherein
said hydraulic power means include, at each respective opposite end portion of said central axle, a first set of oppositely acting cylinder-piston pairs situated between said inner and outer bearings provided at said respective end portion, and a second set of oppositely acting cylinder-piston pairs situated axially outside of said outer bearing.

11. The combination of claim 8 wherein each of said annular members has a substantially central outer groove formed therein, said at least one roll mantle bearing at a respective end portion of said central axle being situated within said groove, and wherein
said hydraulic power means include, at each respective opposite end portion of said central axle, at least one set of oppositely acting cylinder-piston pairs situated on each axial side of said at least one roll mantle bearing.

12. The combination of claim 8 wherein said pressure chambers are adapted to be coupled to a source of pressurized hydraulic fluid through means communicating with said pressure chamber by which separately adjustable pressures can be provided in respective pressure chambers so that the magnitudes of the loading forces applied by said hydraulic power means and the magnitude of the resultant thereof can be regulated.

13. A variable-crown roll forming a nip with a counter-roll, comprising:
a rotatably mounted hollow roll mantle having opposite ends and an inner surface;
a fixed central axle situated within said roll mantle and having a main axle portion and a pair of opposite end portions, said inner surface of said roll mantle and an outer surface of at least said main axle portion defining a space between them;
means situated within said space defined between said roll mantle inner surface and said outer surface of said main axle portion for adjusting the profile of the nip formed between the variable-crown roll and said counter roll;
bearing means for rotatably mounting said roll mantle on said fixed central axle at regions proximate to said mantle ends, said bearing means including at least one roll mantle bearing provided between each respective one of said opposite end portions of said central axle and said roll mantle or an extension thereof;
means for supporting said fixed central axle at regions of said end portions thereof situated axially outside of said roll mantle bearing means;
an annular member provided between each of said central axle end portions and a respective one of said at least one roll mantle bearing; and
hydraulic power means adapted to be coupled to a source of pressurized hydraulic fluid and situated between each of said annular members and a respective one of said central axle end portions for displacing said roll mantle to open and close the nip and for applying forces to end regions of said roll mantle for equalizing the distribution of loading forces acting on the variable-crown roll.

14. The combination of claim 13 wherein said hydraulic power means are structured to act upon said end portions of said central axle substantially in the plane of the nip.

15. The combination of claim 13 wherein said hydraulic power means are structured to act upon said end portions of said central axle substantially symmetrically with respect to the plane of the nip.

16. The combination of claim 13 wherein said hydraulic power means include cylinder-piston pairs comprising substantially radially extending cylinder bores formed in each of said annular members, and a piston mounted for movement in each of said cylinder bores, each of said pistons having an outer end defining a pressure chamber with a corresponding cylinder and an inner end engaging a respective one of said central axle end portions, said pressure chambers adapted to be coupled to a source of pressurized hydraulic fluid.

17. The combination of claim 16, wherein said inner end of each of said pistons is attached to a respective one of said central axle end portions.

18. The combination of claim 16 wherein said bearing means comprise a pair of roll mantle bearings including an axially outer bearing and an axially inner bearing provided between each respective one of said opposite end portions of said central axle and said roll mantle or an extension thereof, and wherein
said hydraulic power means include, at each respective opposite end portion of said central axle, a first set of oppositely acting cylinder-piston pairs situated between said inner and outer bearings provided at said respective end portion, and a second set of oppositely acting cylinder-piston pairs situated axially outside of said outer bearing.

19. The combination of claim 16 wherein each of said annular members has a substantially central outer groove formed therein, said at least one roll mantle bearing at a respective end portion of said central axle being situated within said groove, and wherein
said hydraulic power means include, at each respective opposite end portion of said central axle, at least one set of oppositely acting cylinder-piston pairs situated on each axial side of said at least one roll mantle bearing.

20. The combination of claim 16 wherein said pressure chambers are adapted to be coupled to a source of pressurized hydraulic fluid through means communicating with said pressure chamber by which separately adjustable pressures can be provided in respective pressure chambers so that the magnitudes of the loading forces applied by said hydraulic power means and the magnitude of the resultant thereof can be regulated.

* * * * *

Notice of Adverse Decisions in Interference

In Interference No. 102,265, involving Patent No. 4,757,585, J. Niskanen, VARIABLE-CROWN ROLL, final judgement adverse to the patentee was rendered Aug. 21, 1990, as to claims 13-15.
[*Official Gazette October 23, 1990*]